United States Patent

[11] 3,586,953

[72] Inventors Carl O. Markkanen
  Hasbrouck Heights, N.J.;
  Dale B. Blackwell, Huntington; George A. Knaust, Westbury; Christian R. Kropac, East Northport; John M. McCall, Huntington, N.Y.
[21] Appl. No. 669,926
[22] Filed Sept. 22, 1967
[45] Patented June 22, 1971
[73] Assignee Fairchild Camera and Instrument Corporation

[54] STEPPER MOTOR CONTROL SYSTEM
  10 Claims, 13 Drawing Figs.
[52] U.S. Cl. ................................................. 318/685,
  318/601, 318/603, 318/254
[51] Int. Cl. .................................................... G05b 19/40
[50] Field of Search ........................................ 318/138,
  254, 20.320, 20.310, 20.315

[56] References Cited
UNITED STATES PATENTS

| | | | |
|---|---|---|---|
| 2,710,934 | 6/1955 | Senn | 318/(20.320) |
| 2,796,566 | 6/1957 | Maynard et al. | 318/(20.315) |
| 3,127,587 | 3/1964 | Rasmussen et al. | 318/(20.315) |
| 3,204,165 | 8/1965 | Kreutzer | 318/138 |
| 3,333,089 | 7/1967 | Saylor et al. | 318/(20.320) |
| 3,414,785 | 12/1968 | Orahood et al. | 318/138 |
| 3,446,099 | 5/1969 | Lesher et al. | 318/138 X |
| 3,163,788 | 12/1964 | Powers | 310/261 |
| 3,328,658 | 6/1967 | Thompson | 318/138 |
| 3,324,369 | 6/1967 | Markakis | 318/254 |
| 3,206,665 | 9/1965 | Burlingham | 318/(20.320) |
| 3,353,076 | 11/1967 | Haines | 318/254 X |
| 3,374,410 | 3/1968 | Cronquist et al. | 310/49 X |
| 3,414,786 | 12/1968 | Kasmer et al. | 318/138 X |
| 3,426,258 | 2/1969 | Van Pelt | 318/138 X |

Primary Examiner—G. R. Simmons
Attorney—Laurence B. Dodds

ABSTRACT: A stepper motor drive system includes a shaft carrying an encoder which develops a binary-coded signal representative of 12 discrete shaft positions on either side of a reference position. Binary-coded signals representative of the desired position of the motor and the shaft position signals are applied to a digital comparator and direction logic circuit which develops output pulses until the motor advances to bring the shaft position signals and the input signals into coincidence. The comparator also develops CW or CCW signals indicating the direction of rotation of the motor in order to reach the desired position in the shortest direction. An electromagnetic detent on the motor shaft is controlled by the comparator to lock the motor shaft in the final desired position.

To prevent overshoot of the motor past a desired position $n$ and subsequent oscillation about that position, an auxiliary comparator responsive to the shaft encoder signals and the input signals develops a simulated coincidence signal when the motor reaches the $n-1$ or $n+1$ position, depending upon whether it is rotating CW or CCW, respectively, and this latter signal is utilized to excite the motor momentarily in the reverse direction to check its momentum. Shortly before the motor reaches the final desired position, a forward direction pulse is applied to the motor to drive it to that position.

3,586,953

STEPPER MOTOR CONTROL SYSTEM

CROSS REFERENCE TO RELATED APPLICATION

The control system of this invention is particularly adapted to control the driving stepping motor described in the copending application of John M. McCall, Ser. No. 519,906, filed Jan. 11, 1966, entitled "Turret Font Photocomposing Machine," now Pat. No. 3,434,402 issued Mar. 25, 1969.

BACKGROUND OF THE INVENTION

This invention relates to a stepper motor control system and particularly to such a system effective to position a high-speed stepper motor at any preselected position.

Stepper motors have come to have wide application in systems required accurately to position a driven device in any of a plurality of preselected positions in response to a positioning signal. For example, in aforesaid U.S. Pat. No. 3,434,402, there is described and claimed a photocomposing machine including a type font in the form of a drum having a series of axial rows of type characters. In composing text material, the type font must be driven in a step-by-step manner accurately to position each row of characters in the optical system of the machine. For economically feasible operation, the step-by-step movements of the font drum must be effected with extreme accuracy and rapidity.

Operation of a step-by-step motor in the manner described presents a number of problems. First, there is the problem of energizing the windings of the stepping motor in succession in response to an input signal at a high speed simply by metering out a predetermined number of pulses. Secondly, when such a stepping motor and its connected load are operated at high speed, it develops a considerable amount of angular momentum. If it is attempted to stop the motor suddenly at a preselected position, as it must be in high-speed operation, the motor tends to overshoot and to oscillate or hunt about the selected position. Ordinarily, no useful function can be performed by the system of which the motor is a part until such oscillation has substantially subsided.

It is an object of the invention, therefore, to provide a new and improved stepper motor control system which obviates one or more of the above-mentioned limitations of prior systems of this type.

It is another object of the invention to provide a new and improved stepper motor control system in which the speed of operation is limited only by the character of the motor and the connected apparatus alone, rather than by the ability to supply driving electrical pulses.

It is another object of the invention to provide a new and improved stepper motor control system capable of high-speed operation in which the oscillation or hunting of the moving parts at a preselected position is substantially eliminated.

It is a still further object of the invention to provide a new and improved stepper motor control system in association with an auxiliary accurate positioning device for locking the motor accurately in a preselected position.

SUMMARY OF THE INVENTION

In accordance with the invention, there is provided a system for operating a stepper motor to a preselected position in response to an encoded digital signal comprising a multichannel input circuit for supplying encoded groups of parallel digital control pulses for a motor to be controlled, means adapted to be driven by a motor to be controlled for generating after each step an encoded group of parallel digital position-representative pulses, a coincidence comparator coupled to the input circuit and to the signal-generating means and effective to develop an output pulse upon each successive comparison of the pulse groups when the two pulse groups do not correspond, circuit means responsive to the output pulse for developing and applying a corresponding pulse to a stepper motor to be controlled, and means responsive to correspondence between the two pulse groups for disabling the pulse-developing circuit means to stop the motor.

Further in accordance with the invention, there is provided a system for accurately positioning a stepper motor in a preselected position in response to a series of electrical pulse comprising an input circuit for supplying a series of electrical pulses to a motor to be controlled, a normally deenergized electromagnetic detent including a stator and a rotor connected to be driven by a controlled motor and having an angular positioning accuracy substantially greater than that of the stepper motor, and control means for energizing the detent substantially at the conclusion of the series of pulses to lock the motor in the selected position.

Still further in accordance with the invention, there is provided a system for accurately positioning a stepper motor in a preselected position in response to a series of electrical pulses comprising an input circuit for supplying a series of electrical pulses to a motor to be controlled to effect rotation thereof in a preselected direction, control means for supplying to the motor approximately at the conclusion of the series of pulses at least one electrical pulse tending to cause the motor to rotate in the opposite direction, and means for reenergizing the motor in a sense tending to cause it to rotate in the preselected direction with a time delay less than the interval between adjacent pulses of the series.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

Referring to the drawings:

FIG. 12 is a schematic circuit diagram of an up-down computer-register included in the comparator of FIG. 7, while

DESCRIPTION OF THE PREFERRED EMBODIMENT

Figure 1:
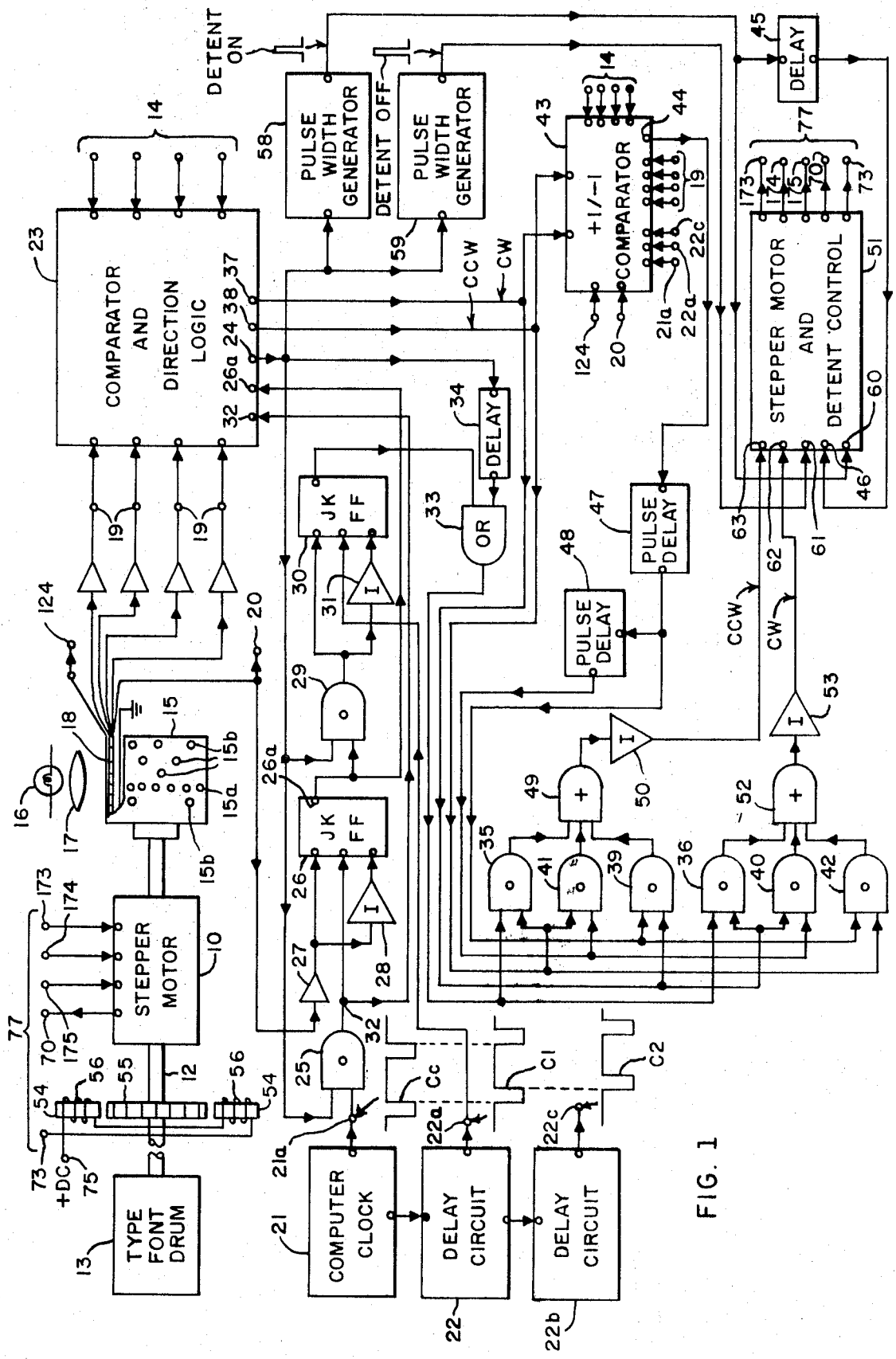
FIG. 1 is a schematic diagram of a complete stepper motor control system embodying the invention.

Referring now to FIG. 1 of the drawings, there is represented a system for operating a stepper motor to a preselected position in response to a digital encoded signal, comprising an input circuit for supplying a digital encoded signal in the form of a series of electrical pulses to a stepper motor 10 to be controlled to effect rotation thereof in a preselected direction. The motor 10 may be any conventional stepper motor having three electrically displaced exciting windings, ∅1, ∅2, and ∅3, as represented schematically in FIG. 4. In one practical embodiment of the invention, the stepper motor was a Model 020-004 obtained from IMC Magnetics Corporation, Westbury, N.Y. The motor 10 includes a rotor 11 of magnetic material having a plurality of salient poles 11a. As well understood in the art, when pulses of current are supplied to the windings #1, #2, and #3 in predetermined sequence, the rotor 11 will rotate in discrete steps of uniform size. The motor 10 is provided with a shaft 12 on which is mounted a type font drum 13 which may be of the type described and claimed in aforesaid copending application Ser. No. 519,906. The digital encoded signal for controlling the system of FIG. 1 is derived from input terminals 14. These input signals 14 are a four-channel coded representation of the desired angular position of the motor 10 and the font drum 13 as derived from a tape reader or other source of signals for controlling the photocomposing machine.

The system of FIG. 1 further comprises means adapted to be driven by the motor to be controlled for generating encoded position-representative signals. This means may be termed, for brevity, a shaft-position encoder and includes a drum 15 having a plurality of encoded position-representative holes 15b arranged in angularly spaced axial rows of code groups and a peripheral ring of equally spaced timing or sprocket holes 15a. This means further comprises a photoelectric hole-sensing apparatus for such code holes and timing holes. This last apparatus may comprise a light source shown schematically at 16, together with an optical system, represented schematically by the lens 17, which illuminates each axial row of the holes 15a,15b as the drum 15 is rotated. Within the drum 15 is an array of photocells 18 of any suitable type for developing electrical pulses from the light passing through the holes 15a,15b. The photocells 18 responding to the holes 15b supply electrical signals via connections 19 while the photocell responding to the sprocket holes 15a develops corresponding electrical signals in the connection 20.

The system of FIG. 1 further comprises a source of timing signals which may be in the form of a computer clock 21 developing at its output terminal 21a a series of negative pulses, as indicated by the waveform Cc, and delay circuits 22a,22b for developing at their respective output terminals 22a,22c a series of similar negative pulses, the first, C1, delayed with respect to the waveform Cc by approximately 1 pulse width and the second, C2, similarly delayed by 1 pulse width with respect to the pulses C1. These clock pulses are preferably at a relatively high frequency, for example 25 kc.

The system of FIG. 1 further includes a coincidence comparator and direction logic unit 23 coupled to the input circuit 14 and to the means generating the encoded signal representative of the position of the stepper motor, specifically the connections 19. The circuitry and operation of the unit 23 are described hereinafter but, in brief, it is effective to develop an output pulse at the output terminal 24 whenever the two encoded signals do not correspond.

The control system of FIG. 1 further comprises circuit means responsive to the output signal of the comparator unit 23 and to the timing pulses Cc and C1 from the clock 21 for developing and applying one or more driving pulses to the stepping motor 10 which is to be controlled. This circuit means includes a connection from the output terminal 24 to a coincidence gate 25 to which the clock pulses Cc are also applied. The output of the gate 25 is connected to a JK flip-flop unit 26 to which is also coupled the motor shaft position-representative or sprocket signals via the connection 20 through a buffer amplifier 27 and an inverter 28. The JK flip-flop is a standard logic unit described in "Logical Design of Digital Computers" by M. Phister, Jr., Wiley, 1958. The logic of this circuit will be described hereinafter in connection with the operation of the system as a whole. The unit 26 generates motor driving pulses from the sprocket channel 20 and supplies them to a coincidence gate 29 to which is also supplied the output signal from the terminal 24 of the comparator unit 23. At coincidence, the motor driving pulses from the unit 26 are applied to a second JK flip-flop unit 30 by connections including an inverter 31, the trigger terminal of the unit 30 being connected to the delay circuit 22 to receive pulses C1. Concurrently, the clock pulses Cc from the gate 25 are applied to an input terminal 32 of the comparator unit 23 normally to supply trigger or timing pulses to this unit except upon the occurrence of a signal (absence of a pulse) at the output terminal 24 indicating coincidence between the signals on input terminals 14 and 19 of comparator unit 23. It will be seen that the circuit just described comprises means responsive to correspondence between the two encoded signals applied to the comparator unit 23 for disabling the circuit means including the JK flip-flops 26 and 30 and, thus, interrupting the motor driving pulses to stop the motor 10.

The motor driving pulses generated by the JK 30, as described, are applied to a coincidence gate 33 to which is also applied 25 (FIG. from the output terminal 24 of comparator 23 via a delay unit 34 having a delay of the order of 10 milliseconds to allow time for deenergization of the motor brake or detent described hereinafter. The output signal from the gate 33 is applied to a pair of AND gates 35 and 36. The comparator 23 is also effective to sense the direction of the shorter rotational movement of the motor 10 to produce JK in the comparator and to modify its output accordingly. Specifically, the comparator 23 develops at output terminals 37 and 38 clockwise (CW) and counterclockwise (CCW) signals which are applied, respectively, to AND gates 39, 36, and 40 and to AND gates 35, 41, and 42. In the actual embodiment of the invention represented by FIG. 1, the gates 35, 36, 39, 40, 41, and 42 were NAND gates, each producing an output of an AND gate with invented polarity. Since this does not affect the basic logic of the circuit, the gates are described as simple AND gates.

The control system of FIG. 1 further includes a +1 and −1 comparator unit 43 having a group of input terminals connected to the lines 19 from the photoelectric pickup device 18; a second group of input terminals connected to the input terminals 14 of the computer; and a third group of input terminals connected to the CW and CCW terminals 37 and 38, respectively. The comparator 43 and its operation are described in detail hereinafter. It is effective to develop a coincidence signal when the signal from the shaft encoder on the conductors 19 is a binary number either one bit more or one bit less than the binary input signals 14 from the computer, depending upon whether the motor 10 is stepping CW or CCW. When coincidence is reached, a signal is developed at an output terminal 44 and applied to a pulse-delay unit 47 having a delay of the order of 2 milliseconds, the output of which is connected to AND gates 39 and 42. The delayed pulse from the unit 47 is also applied to a second pulse-delay unit 48 having a delay of the order of 1.4 milliseconds, the output of which is connected to AND gates 40 and 41. The pulse-delay units may be conventional monostable multivibrators. The outputs of the AND gates 35, 41, and 39 are connected to an OR gate 49 and thence through an inverter 50 to the CCW input terminal 63 of the stepper motor and detent control unit 51. Similarly, the outputs of the AND gates 36, 40, and 42 are connected to an OR gate 52 and thence through an inverter 53 to the CW input terminal 62 of the unit 51, described in detail hereinafter.

Figure 2:
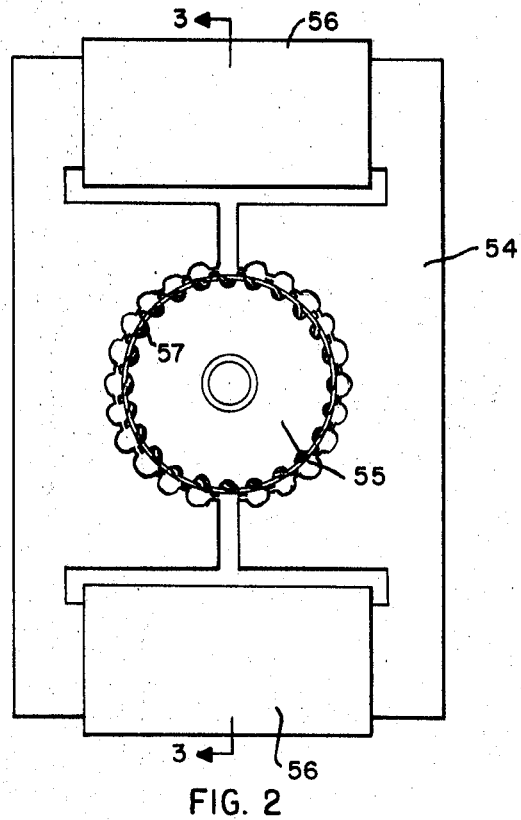
FIG. 2 is a front elevation of an electromagnetic detent comprising one of the components of the system of FIG. 1.
Figure 3:
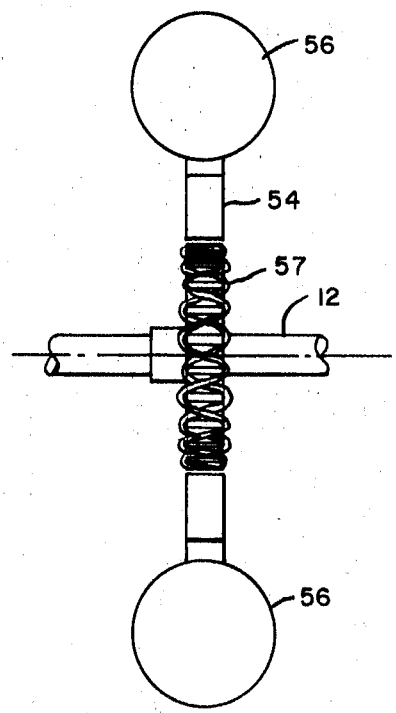
FIG. 3 is a side elevation of the detent of FIG. 2, partly in section.

The control system of FIG. 1 further comprises a normally deenergized electromagnetic detent including a stator 54 and a rotor 55 mounted on the motor shaft 12. The electromagnetic detent is preferably in the form of an electromagnetic detent, as shown in FIGS. 2 and 3, the stator 54 and the rotor 55, being constructed of paramagnetic material, having a plurality of complementary precision-formed teeth and the stator 54 being provided with a pair of energizing windings 56,56. Upon the energization of the windings 56,56, the rotor 55 is locked with its teeth registering with those of the stator 54. Preferably, the rotor is provided with a damping winding means surrounding its teeth, specifically a winding 57 having short-circuited turns surrounding each of the teeth of the rotor.

The control system of FIG. 1 further comprises means for energizing the electromagnetic brake or detent approximately in time coincidence with the occurrence of a signal (absence of pulses) at the output terminal 24 of comparator 23, indicating coincidence between the input signals 14 and those on the lines 19. This means may comprise a pair of pulse width generators 58 and 59 controlled by the signal from the output terminal 24 of comparator 23 and generating Detent ON and Detent OFF pulses. The latter pulses are applied to input terminal 61 of the control unit 51 while the Detent ON signals are applied to the terminal 60 of such unit. Detent ON signals from unit 58 are also applied via a delay unit 45, providing about a 10 ms. delay, to Reduced Power terminal 46 of the control unit.

Figure 4:
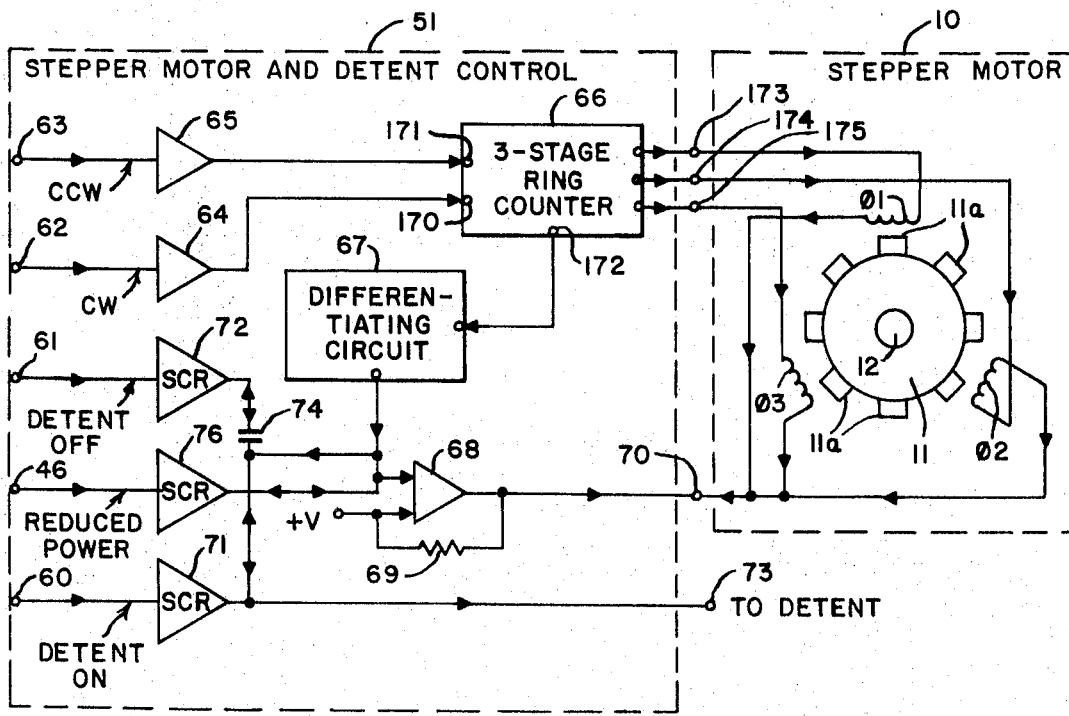
FIG. 4 is a circuit diagram of an electrical control circuit of the stepper motor and detent mechanism of FIG. 1.

Referring to FIG. 4, there is shown the control unit 51 of FIG. 1 with the corresponding elements identified by the same reference numerals. As shown, the CW and CCW signals are applied to input terminals 62 and 63, respectively, and are impressed upon amplifiers 64 and 65, respectively, and thence to a three-stage ring counter circuit 66 so that motor driving pulses arriving either at terminal 62 or terminal 63 are utilized to control the energization of the stator windings ∅1, ∅2, and ∅3 of the stepper motor 10, via terminals 173, 174, 175, respectively, in the proper combinations and in the proper sequence to effect stepping of the motor 10 in the CW or CCW direction. The ring counter circuit 66 and its operation are described hereinafter in connection with FIG. 13.

Detent ON terminal 60 is connected to the input or control electrode of an SCR unit 71, the output of which is in series with the detent winding 56 connected to terminal 73. Detent OFF terminal 61 is connected to the input or control electrode of an SCR unit 72. As is well known, an SCR unit is a three-element semiconductor device which is turned on by applying a positive pulse to its input electrode or "gate" and turned off by applying a negative pulse to its anode. The anodes of the units 71 and 72 are cross-coupled by a capacitor 74 to form a conventional SCR flip-flop so that when either of the units 71,72 is turned on, the other is turned off.

Reduced Power terminal 46 is connected via SCR unit 76 to the input or control electrode of a series-pass power amplifier, for example a power transistor 68 the emitter-collector circuit of which is connected in parallel with a dropping resistor 69 and to a suitable supply terminal +V, the parallel-connected elements being in series in the common return line 70 of the motor windings. The ring counter unit 66 is coupled to a differentiating circuit 67 to develop a negative-going pulse on the trailing edge of the first CW or CCW pulse applied to the unit 66, as described hereinafter, and to apply it to the anodes of the SCR units 71 and 76, to the input electrode of power transistor 68, and, through the capacitor 74, to the anode of the SCR unit 72 although, as described hereinafter, this negative-going pulse has no effect on the units 68 and 71.

To avoid confusion in the schematic diagram of FIG. 1, the several output connections of the control unit 51 are represented collectively by the numeral 77, the corresponding group of connections being shown to the motor 10 and detent 54,55.

Figure 5:
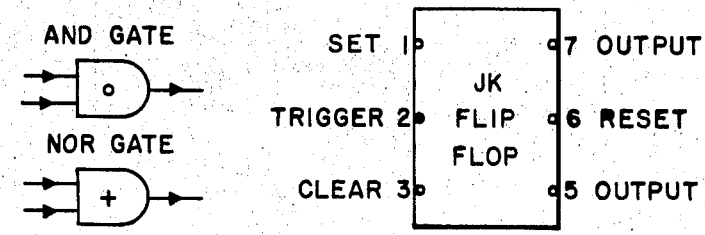
FIG. 5 comprises symbolic representations of standard binary logic units utilized in the computing systems of the invention.

Before explaining the operation of the control system of the invention as a whole, it is believed that it would be helpful to describe and explain such of the basic components referred to above as are not purely conventional. A physical embodiment of the invention described utilized negative logic, that is, a pulse or voltage level of 0 (ground) represented the digit 1 and a pulse or a state of high-voltage level (+V) represented 0. In FIG. 5 are represented standard symbols for an AND gate and a NOR gate. A schematic representation of the standard JK flip-flop is also shown in FIG. 5. In this logic circuit, for normal output, terminal 7 is at voltage level ground (digit 1) and terminal 5 at voltage level +V (digit 0). The JK unit changes its output states only upon the application of a trigger or clock pulse to terminal 2. The logic of a standard JK flip-flop unit is shown in the following table in terms of digital representation:

| Input terminals | | Output terminals | |
|---|---|---|---|
| 1 | 3 | 7 | 5 |
| 0 | 0 | No change | |
| 1 | 0 | 1 | 0 |
| 0 | 1 | 0 | 1 |
| 1 | 1 | Reversal | |

[1] Normal

Thus, for the four possible permutations of input digits 0 and 1, there are four unambiguous output states. When both inputs are given states representative of digit 0, the JK unit does not change, that is, its output states remain the same. If both inputs are given states representative of digit 1, the output states always reverse from the previous states.

Figure 6:
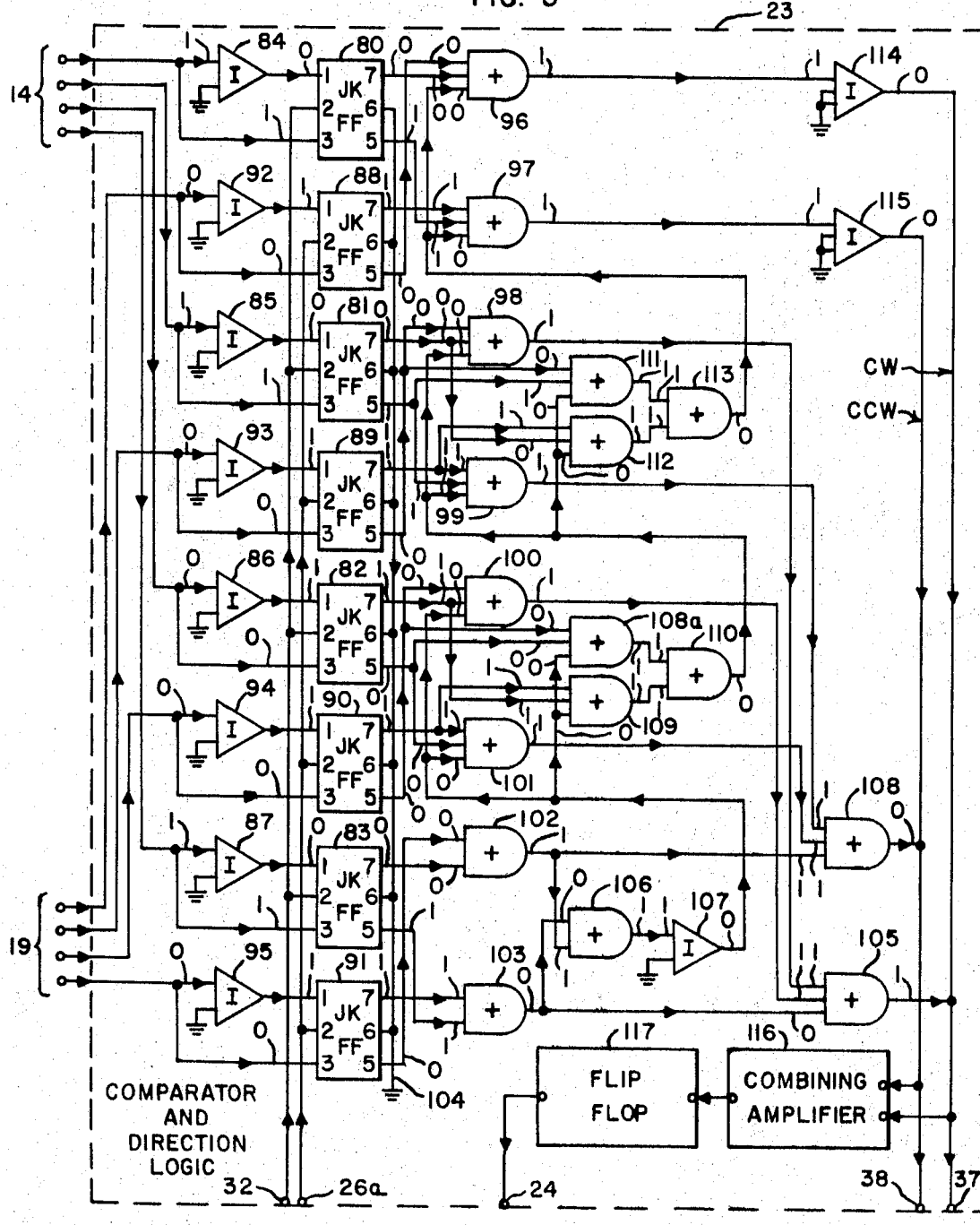
FIG. 6 is a schematic diagram of a comparing and direction logic unit of the system of FIG. 1.

Referring now to FIG. 6, there is represented schematically the comparator and direction logic unit 23 of FIG. 1 which, in effect, comprises two banks of registers or JK flip-flops, one group comprising the units 80, 81, 82, and 83 connected to computer input terminals 14, the connection to the terminal 1 of each of the units 80—83 including inverter or polarity-reversing signal repeaters 84—87, respectively, since, in the particular logic circuit employed, the inputs of each of the JK units are always either 0,1 or 1,0.

Similarly, the lines 19 from the shaft encoder 15—18 are connected to the second bank of JK flip-flops 88—91, inclusive, the connections being made directly to the input terminal 3 of each of the JK units and via inverters 92—95, inclusive, to terminals 1 of the JK units.

As shown in FIG. 6, the JK units of the two groups are arranged in pairs 80,88; 81,89; etc., each pair representing digits of a particular order in the binary code number. A comparison of the shaft encoder position, as represented at the lines 19 and the input signal from the terminals 14, is made b each pair of JK units in succession from the most significant digit (highest order) to the least, the comparisons being made by way of a series of NOR gates. As well known, the logic of a NOR gate is that if any or all of its inputs are at a voltage level representative of the digit 0, the output is at a voltage level representative of the digit 1. Only if all of the inputs are at a voltage level representative of the digit 1 is the output at a level representative of the digit 0.

(FIG. terminal 2 of each of the JK units 80—83 is connected to the terminal 32 of the output of gate 25 FIG. 1) to receive the trigger pulses C1 while the terminal 2 of each of the JK units 88—91 is connected to the output terminal 26a of JK unit 26 (FIG. 1) at which appear the shaft encoder sprocket pulses as gated with the clock pulses Cc from clock 21 to provide sharper cleaner pulses than those developed by the shaft encoder. The terminals 6 of all of the JK units are connected to ground via a conductor 104, as shown.

The output states of each of the corresponding pairs of JK units, such as the pairs 80,88; 81,89, etc., are compared by a pair of NOR gates similarly connected. For example, the state at terminal 7 of the JK unit 80 and at terminal 5 of the JK unit 88 are connected to NOR gate 96 while the state at terminal 5 of the JK 80 unit and that at terminal 7 of the JK 88 unit are connected to NOR gate 97. Similarly, the states of the JK units 81,89 are compared by similarly connected NOR gates 98,99; the states at the output terminals of JK units 82,90 are compared in NOR gates 100,101; while the output states of the JK units 83,91 are compared in NOR gates 102,103. Each of the NOR gates 96—101 includes a third input terminal connected in the manner and for the purpose described hereinafter.

It is believed that the operation of the comparator and direction logic unit 23 shown in FIG. 6 may best be explained by referring to additional circuit components in the order in which they function in the overall unit. For the purposes of this explanation, operation within a given "upper rail" or "lower rail" of the shaft encoder 15—18 (described hereinafter) is assumed. It is also assumed that the lowermost pair of JK units 83,91 represent the highest order digit; that the encoded signals representative of the position of the shaft 12 and those supplied by the input terminals 14 representative of the desired position of the shaft 12 are initially the following binary numbers:
Shaft position    1 0 1 1 (Position 11)
Desired shaft position    0 0 1 1 (Position 3)

Consider first the JK units 83,91 corresponding to the highest order digit. For convenience, the digital information set out above is shown at the inputs of each of the JK units 80—83 and 88—91 as well as the corresponding digital information at their output terminals; at the input and output terminals of the immediately following NOR gates 96—103; and at the additional NOR gates (to be described) after the above digital numbers have been inserted in the JK units. Since the inputs to the JK units 83 and 91 are opposite, their outputs are also opposite and the interconnections to the NOR gates 102,103 are such as to produce the outputs 1,0 respectively. The 0 at output terminal of NOR gate 103 is applied to an input terminal of a three-input NOR gate 105. As explained later, each of its other input terminals has a 1 applied thereto so that output terminal is also a 1 (ground) and this results in a negative state applied to the terminal 37 (unit 23, FIG. 1) which, as explained hereinafter, causes the motor to step in a CW direction.

The outputs of the NOR gates 102 and 103 are also applied to a NOR gate 106 whose output is connected to the input circuit of an inverter 107. With these connections, whenever the input of the JK units 83 and 91 are dissimilar, indicating that the shaft 12 is not in a desired position as just assumed, the output terminal of inverter 107 produces an output 0 which inhibits comparison of the stages carrying the less significant digits of the input signals 14 and 19 and comprising the other three pairs of JK units, as described hereinafter. However, when the output of either of the NOR gates 102 or 103 has a 0 output, the NOR gate 105 or its counterpart 108 (to be described) develops a 1 in its output circuit and supplies a pulse to one of the terminals 37,38 to advance the motor one step CW or CCW, respectively.

Specifically, under the conditions assumed, NOR gate 103 has a 0 output, causing NOR gate 105 to develop a 1 in its output circuit, thereby to deliver a motor stepping pulse to the CW line. At the same time, each of the inputs to the NOR gate 108 is a 1, causing it to develop a 0 in its output, that is, no CCW motor stepping pulse. The logic is such that the NOR gates 105,108 cannot both deliver motor stepping pulses at the same time.

After the motor has stepped, the shaft encoder 15—18 develops a new shaft-representative code signal 19 and supplies it to the JK units 88—91 and the comparison described is repeated. Successive binary numbers inserted in the JK units 88—91 are represented in the following table, assuming that the motor takes one step after each comparison, that the shaft encoder has 12 shaft positions, and that the motor moves in the shortest direction to the desired position:

Initial shaft position signal    1 0 1 1 (Position 11)
Second position signal    1 0 1 0 (Position 10)
Third position signal    1 0 0 1 (Position 9)
Fourth position signal    1 0 0 0 (Position 8)
Fifth position signal    0 1 1 1 (Position 7)
Sixth position signal    0 1 1 0 (Position 6)
Seventh position signal    0 1 0 1 (Position 5)
Eighth position signal    0 1 0 0 (Position 4)
Ninth position signal    0 0 1 1 (Position 3)

After completing the last step described above, all digits of the shaft encoder signal 19 now correspond to that of the input signal 14 (Position 3) and the outputs of the JK unit 91 reverse to correspond to those of the JK unit 83. This reverses the outputs of NOR gates 103, 106, and 105 so that no further motor stepping pulses are delivered to the CW line but it does not reverse NOR gates 102 and 108. At the same time, the output of inverter 107 is reversed, removing the inhibiting signal from NOR gates of the less significant digit stages and permitting a comparison of the signals 14 and 19 in each of these stages in succession, in a manner similar to that just described.

Coming back to the initial cycle and considering the second pair of JK units 82,90, since their inputs are the same (digit 0 on both line 19 and terminal 14), NOR gates 100,101 connected thereto have inputs 1,0 and 0,1 while the 0 signal from inverter 107 is applied to the third input of each of these NOR gates and each develops an output 1 as indicated, these outputs being applied to inputs of NOR gates 105 and 108, respectively.

The second stage of the comparator including JK units 82,90 also includes an auxiliary logic circuit comprising NOR gates 109 and 108a respectively connected to those units similarly to the NOR gates 100,101 so that each of them also develops an output 1, these outputs being applied to a NOR gate 110 which develops an output 0 and which, in turn, is applied as an inhibiting pulse to NOR gates 98,99 to cause each of them to develop an output 1, these outputs being applied as third inputs to NOR gates 105 and 108, respectively. Thus NOR gate 105 now develops an output 0, as in the case of correspondence of the most significant digits of the signals 14 and 19, as previously described, and the motor is not stepped.

The third stage of the comparator comprising JK units 81 and 89 is supplied with dissimilar pulses, as in the first stage described above, so that the NOR gates 98,99 coupled thereto have their first two terminals supplied with input 0's and input 1's respectively. However, the third input of each of the NOR gates 98,99 is supplied with 0 from the NOR gate 110, as a result of which each of the gates 98,99 develops an output 1 and these outputs are applied to the gates 105 and 108, respectively. Thus, only gate 105 is conditioned, as described above, to develop a 1 in its output circuit and to apply a CW motor stepping pulse to terminal 37.

The third stage including the JK units 81,89 also includes an auxiliary logic circuit comprising NOR gates 111 and 112 coupled to a NOR gate 113 connected in the same manner as the auxiliary logic circuit of the second stage described above. The NOR gate 113 also develops a 0 output which is applied to NOR gates 96,97 to inhibit their operation as previously described.

Coming now to the fourth stage of the comparator circuit comprising the JK units 80,88, they are connected to NOR gates 96 and 97 in the same manner as the previous stages. Under the assumed conditions, each of these gates will develop a 1 output and these outputs are applied through inverters 114 and 115, respectively, the outputs of which are connected to the CW and CCW lines respectively. The logic of the circuit is such that the NOR gates 96,97 and their respective inverters 114,115 operate effectively in parallel with the NOR gates 105,108, respectively, and this parallel combination functions as the equivalent of a four-input NOR gate.

The CW and CCW lines connected to the terminals 37,38, respectively, are also connected to a combining amplifier 116 which, in turn, is connected to a flip-flop circuit 117 and thence to the terminal 24 (unit 23, FIG. 1) at which appears a signal representative of coincidence or noncoincidence of the binary coded signals developed by the shaft encoder 15—18 and that supplied by the computer input terminals 14.

As previously explained, the +1/−1 comparator unit 43 of FIG. 1 is effective to develop a coincidence signal when the signal from the shaft encoder on the conductors 19 represents a binary number either one bit more or one bit less than the binary input signals 14 from the computer, depending upon whether the motor 10 is stepping CW or CCW. The function of this unit is to bring the type font drum 13 rapidly to its final position without overshooting. In brief, the unit 43 is effective to produce a simulated coincidence between the signals 19 from the shaft encoder and the signals 14 from the computer one position in advance of actual coincidence and to apply a reversing pulse to the stepper motor 10 (a "plugging" pulse) to check its angular momentum and, after a predetermined time delay, to apply to the motor 10 a forward pulse to bring it precisely into its final position. In other words, simulated coincidence is effected at the $(n-1)$ position of the shaft encoder with respect to the position called for by the computer, which requires adding a pulse if the encoder is moving in a CCW direction and subtracting a pulse if it is moving in the CW direction.

Figure 7:
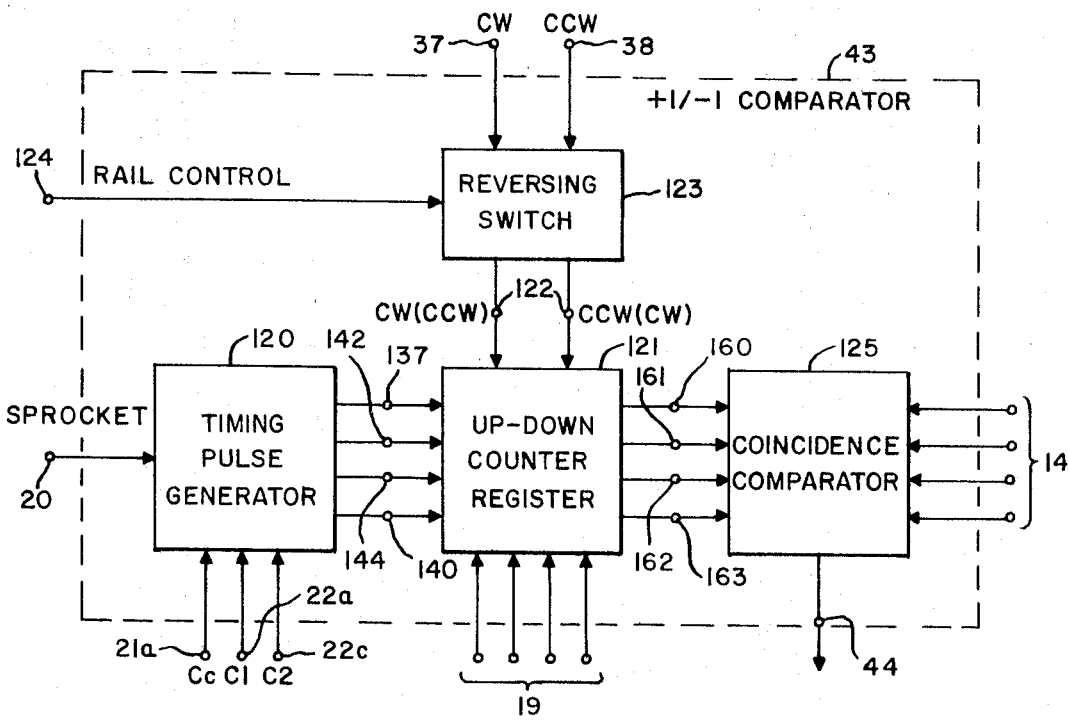
FIG. 7 is a block diagram of a +1/−1 comparator embodied in the system of FIG. 1.

The +1/−1 comparator unit 43 of FIG. 1 is shown in block form in FIG. 7 and consists of a timing pulse generator 120 to which is applied a sprocket pulse from the terminal 20 and the clock pulses Cc, C1 and C2 derived from the computer clock 21 (FIG. 1). The generator 120 develops four timing or control pulses, described hereinafter, and applies them to an up-down computer register 121 to which are also applied the shaft encoder signals 19. As described hereinafter, the operation of the unit 121 is to count up or down depending upon whether the shaft encoder is moving in the CW or CCW direction and, for this purpose, there is applied to the unit 121 signals from output terminals 122 of a reversing switch 123 supplied with CW and CCW signals from the terminals 37 and 38, respectively, of the logic unit 23 of FIG. 1. The switch 123 is also provided with a "rail control" signal from terminal 124 of the shaft encoder (FIG. 1) to be described. The unit 121 develops the simulated shaft encoder position signals and applies them to a coincidence comparator 125 to which are also supplied the desired position signals 14. The unit 125 develops, at the output terminal 44 of the comparator 43, a signal representative of the simulated coincidence between the shaft encoder position signals 19 at the ($n-1$) position of the shaft encoder and the desired position signals 14, as described hereinafter.

EAch of the components of the comparator unit 43 of FIG. 7 will be described in order. Initially, it may be helpful to refer to FIG. 8 which is a schematic diagram of the several positions of the shaft encoder of FIG. 1 comprising 12 "upper-rail" positions and 12 "lower-rail" positions symmetrically located on opposite sides of the axis of the encoder.

The binary representation of the 24 positions is shown in the following table, which indicates that the upper-rail code includes an additional channel of highest digital significance with a 1 in each position to indicate that the encoder is in the upper-rail position, this channel developing a "rail signal" at the terminal 124 (FIG. 1).

|  | Lower-rail code | | | | Upper-rail code | | | | |
|---|---|---|---|---|---|---|---|---|---|
| Position: | | | | | | | | | |
| 1 | 0 | 0 | 0 | 1 | 1 | 0 | 0 | 0 | 1 |
| 2 | 0 | 0 | 1 | 0 | 1 | 0 | 0 | 1 | 0 |
| 3 | 0 | 0 | 1 | 1 | 1 | 0 | 0 | 1 | 1 |
| 4 | 0 | 1 | 0 | 0 | 1 | 0 | 1 | 0 | 0 |
| 5 | 0 | 1 | 0 | 1 | 1 | 0 | 1 | 0 | 1 |
| 6 | 0 | 1 | 1 | 0 | 1 | 0 | 1 | 1 | 0 |
| 7 | 0 | 1 | 1 | 1 | 1 | 0 | 1 | 1 | 1 |
| 8 | 1 | 0 | 0 | 0 | 1 | 1 | 0 | 0 | 0 |
| 9 | 1 | 0 | 0 | 1 | 1 | 1 | 0 | 0 | 1 |
| 10 | 1 | 0 | 1 | 0 | 1 | 1 | 0 | 1 | 0 |
| 11 | 1 | 0 | 1 | 1 | 1 | 1 | 0 | 1 | 1 |
| 12 | 1 | 1 | 0 | 0 | 1 | 1 | 1 | 0 | 0 |

Figure 9:
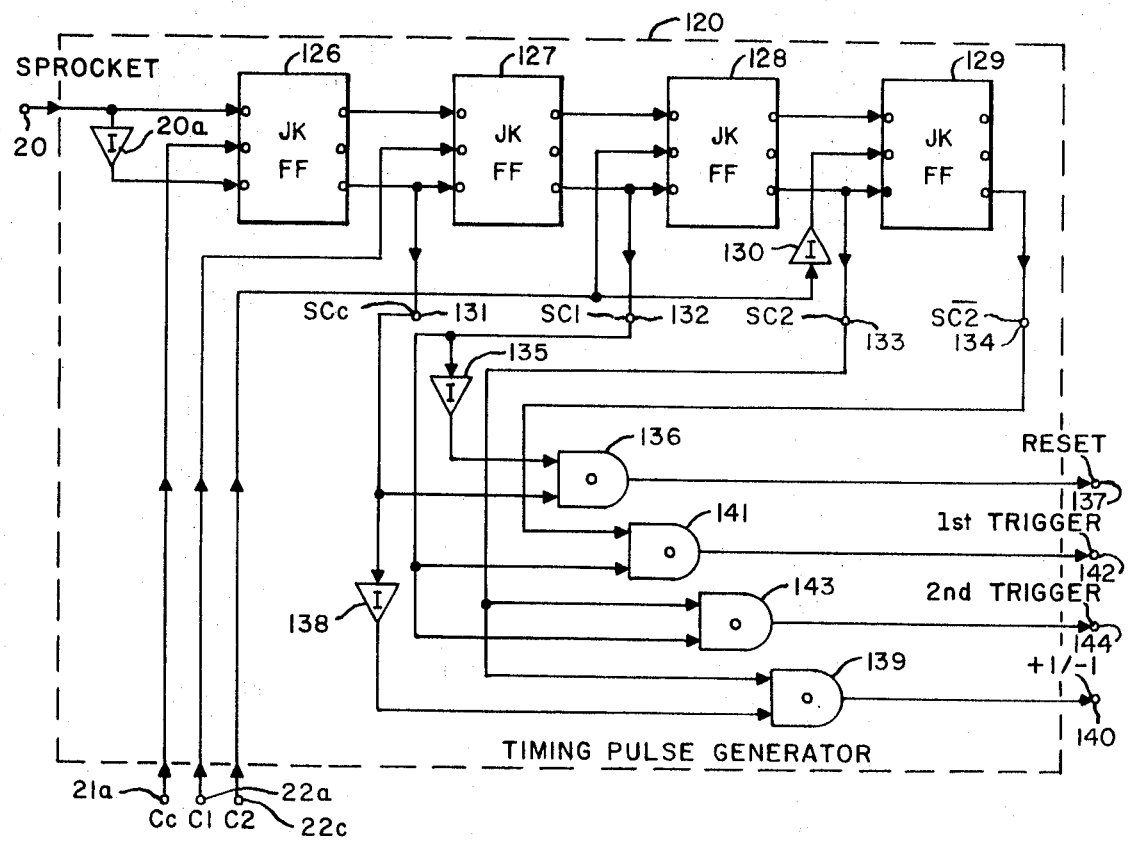
FIG. 9 is a schematic diagram of a timing pulse generator included in the apparatus of FIG. 7.
Figure 10:
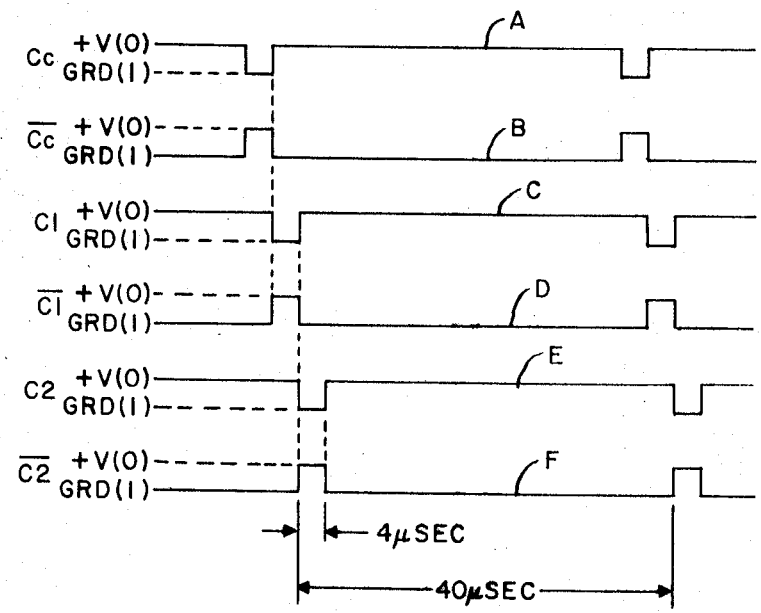
FIGS. 10 and 11 are sets of curves illustrating the waveforms of the several signals utilized in, and developed by, the generator of FIG. 9.

The timing pulse generator 120 of FIG. 7 is shown schematically in FIG. 9 and, as indicated, receives sprocket pulses from terminal 20 and timing pulses Cc, C1, and c2 from terminals 21a, 22a, and 22c, respectively. Timing pulses Cc, C1, and C2 are represented by Curves A, C, and E, respectively, of FIG. 10 while the inverse (the "NOT") of these pulses is represented by Curves B, D, and F of FIG. 10. In one apparatus embodying the invention, each of the timing pulses Cc, C1, and C2 had a duration of 4 $\mu$sec. and a repetition period of 40 $\mu$sec., as indicated, and each successive pulse was delayed with respect to the preceding pulse by the duration of one pulse, that is, 4 $\mu$sec. Thus the clock pulses Cc, C1, C2 are mutually exclusive. In accordance with accepted notation, the inverse or NOT of any signal bears the same reference character as that signal with a superior bar and is developed by passing the main signal through a logic inverter.

Figure 11:
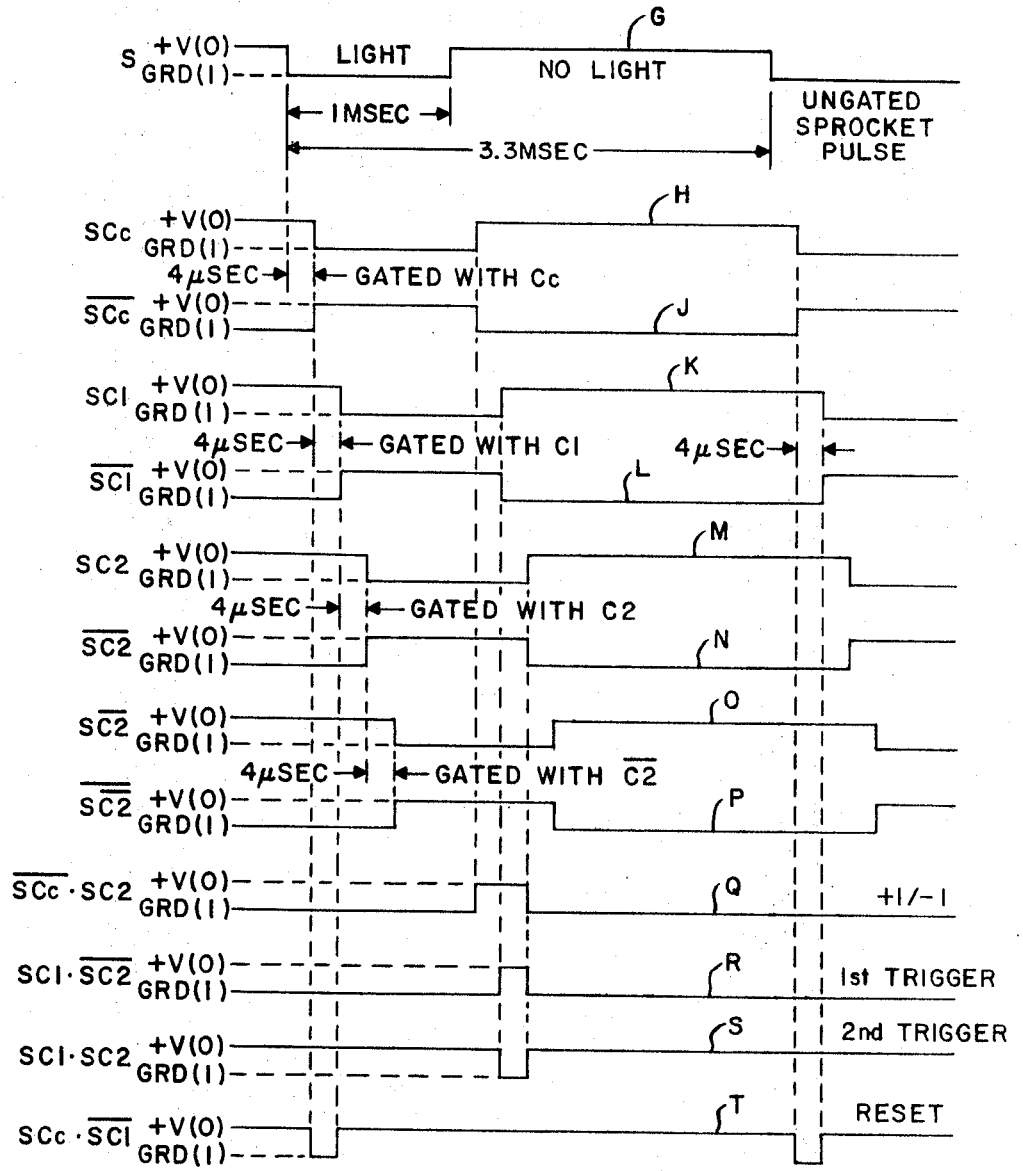

The several pulse signals developed by the pulse generator 120 are shown by the curves of FIG. 11, described hereinafter. The generator of FIG. 9 comprises four JK flip-flop units 126, 127, 128, and 129 connected in cascade. Sprocket pulses from the input terminal 20, represented by Curve G of FIG. 11, are applied in conventional manner to the first JK unit 126. This unit is gated by the computer clock pulse Cc from terminal 21a so that a signal SCc at its output terminal 131, applied to the succeeding JK unit 127, is represented by Curve H of FIG. 11. This latter signal applied to the JK unit 127 is, in turn, gated by the first delayed clock signal C1 from terminal 22a to develop a signal SC1 at its output terminal 132 represented by Curve K. The latter signal is, in turn, applied to the third JK unit 128, which is gated by the second delayed clock signal C2 applied from terminal 22c and produces at its output terminal 133 a gated signal SC2 represented by Curve M of FIG. 11. This signal, in turn, is applied to the fourth JK unit 129 which is gated by the second delayed clock signal C2 applied from terminal 22c through an inverter 130 so that the unit 129 develops at its output terminal 134 a signal $\overline{SC2}$ represented by Curve 0 of FIG. 11.

In order to develop the desired timing or control signals, the signal SC1 at terminal 132 is passed through an inverter 135 and the inverted signal $\overline{SC1}$, represented by Curve L of FIG. 11, together with the signal SCc at terminal 131, are applied to an AND gate 136 to develop at its output terminal 137 a reset signal represented by Curve T of FIG. 11. Again, the signal SCc at terminal 131 is inverted by inverter 138 to form the signal $\overline{SCc}$ represented by Curve J of FIG. 11. This latter signal is applied to an AND gate 139 to which is also applied the signal SC2 from terminal 133. There appears at output terminal 140 a gate 139 a +1/−1 signal represented by Curve Q of FIG. 11 which, when gated with the CW and CCW signals as described hereinafter, determines whether the simulated position of the shaft encoder is formed by adding 1 or subtracting 1 from the true position. Further, the signal SC1 at terminal 132 is applied to an AND gate 141 to which is also applied the signal $\overline{SC2}$ from terminal 134, represented by Curve 0, to develop at its output terminal 142 a first trigger signal represented by Curve R of FIG. 11. The signal SC1 is also applied to an AND gate 143 jointly with the signal SC2 from terminal 133 to develop in its output terminal 144 a second trigger signal represented by Curve S of FIG. 11.

Figure 12:
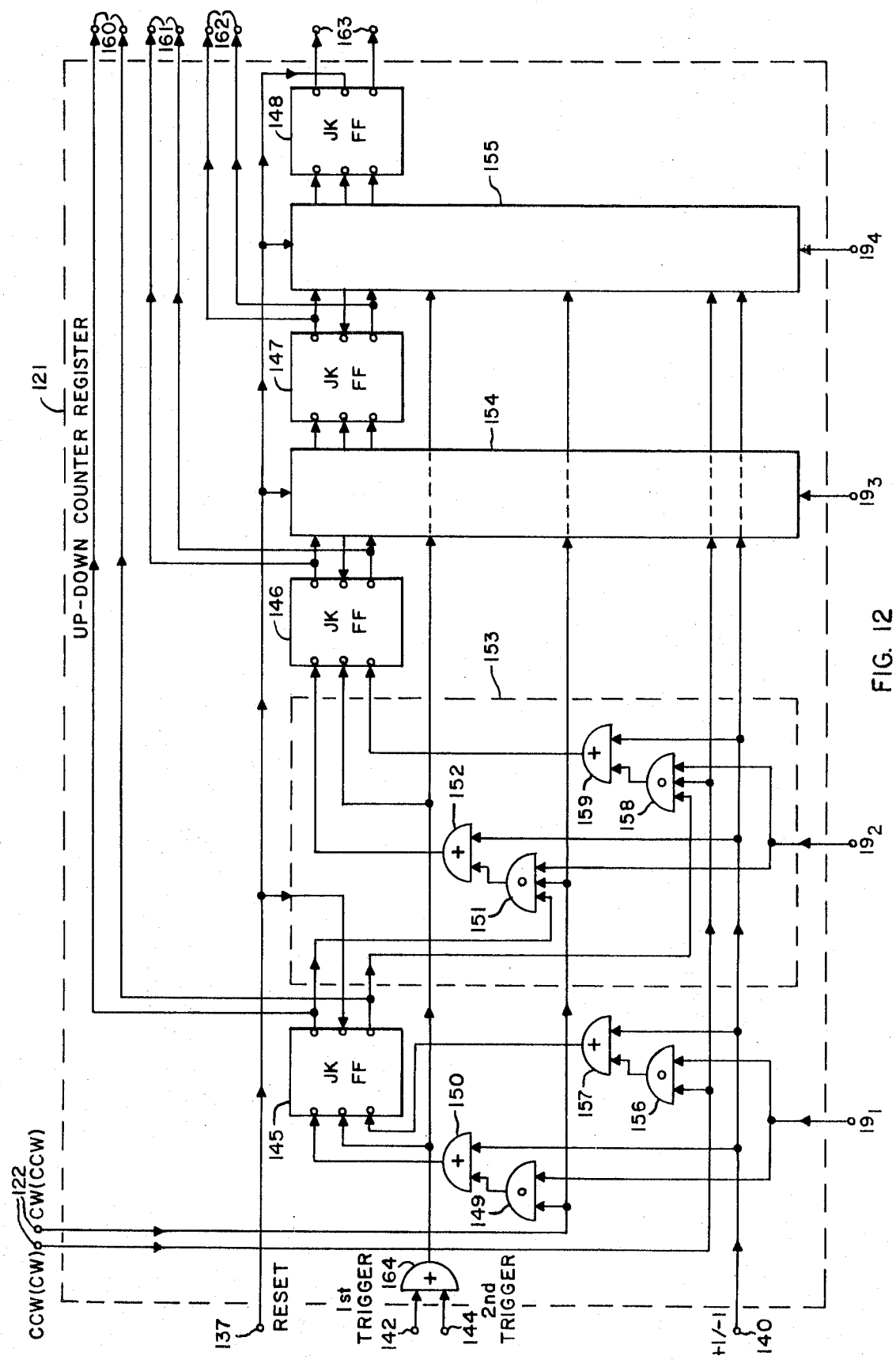

As shown in FIG. 7, the four timing or control signals developed by the generator unit 120 of FIG. 9, as just described, are applied to the up-down counter register 121, which is shown in schematic form in FIG. 12. The unit 121 comprises four JK flip-flops 145, 146, 147, and 148 comprising a four-channel register. The shaft encoder signal $9_1$ and the CW signal are applied to an AND gate 149 the output of which is applied together with the +1/−1 signal to a NOR gate 150 the output of which is applied to an input of the JK unit 145. If the CW–CCW logic calls for clockwise rotation of the shaft encoder, then the NOR gate 150 is effective to insert a 1 in the JK unit 145, which stores the least significant digit, causing the unit 145 to change its state. A transition or carryover pulse from the output of unit 145 is applied to an AND gate 151 together with the CW signal and the second channel shaft encoder signal $19_2$. The output of the AND gate 151 is applied to a NOR gate 152 together with the +1/−1 signal which, in the event of a carryover signal from unit 145, is effective to insert a 1 in the JK unit 146.

The interstage coupling between the JK units 145 and 146 included within the dashed-line box 153 and the interstage couplings between the units 146 and 147 and between the units 147 and 148 are duplicates of the box 153 and are represented by the boxes 154 and 155, respectively. In this way, under the assumed conditions, one digit is added to the binary number stored in the register comprising the units 145—148.

Figure 8:
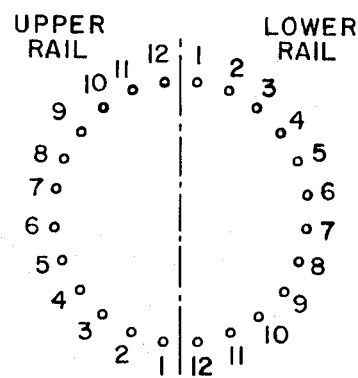
FIG. 8 is a schematic diagram showing the several positions of the shaft encoder of FIG. 1.

On the other hand, if the CW–CCW logic calls for counter-clockwise rotation of the shaft encoder, that is, in the order of decreasing position numbers as represented in FIG. 8, then it becomes necessary to subtract 1 from the actual shaft encoder position to obtain the desired simulated shaft position one position in advance of the real position. Under these conditions, the first encoder channel signal $19_1$ is combined with the CCW signal in an AND gate 156, the output of which is, in turn, combined with the +1/−1 signal in a NOR gate 157, the effect of which is to present a −1 to the JK unit 145. If there is a carryover in the lower output of JK unit 145, this is applied, together with the second channel shaft encoder signal $19_2$ and the CCW signal to an AND gate 158, the output of which is combined with the +1/−1 signal in a NOR gate 159 which, in a similar manner, subtracts 1 from the signal stored in the JK unit 146. In a similar manner, the interstage coupling units 154 and 155 act upon the following JK units 147 and 148, respectively, so that the binary number stored in the register 145—148 is decreased by 1 (that is, a −1 is added). When this process is completed, the signal outputs 160, 161, 162, and 163 of the JK units 145, 146, 147, and 148 respectively, then will have stored therein the simulated shaft encoder position, that is, its actual position +1 or −1.

As indicated in FIG. 7, the signal outputs 160—163 of the JK units 145—148, respectively, are applied to a coincidence comparator 125 to which are also applied the signals representing the desired shaft position. The coincidence comparator 125 may be of any conventional type and, when the simulated shaft position coincides with the desired shaft position, the unit 14 developes an output pulse at its terminal 44.

The insertion of the signals just described into the JK units 145—148 and the reading out of the signals therefrom are under the control of the first and second trigger signals, which are applied thereto through an OR gate 164, the first trigger signal being effective to insert a +1 or −1 into the JK units 145—148 and the second trigger signal being effective to read out the stored signals into the comparator 125. After completion of one sprocket pulse cycle, a reset pulse, Curve T, resets the JK flip-flops 145—148 to their normal state.

The overall operation of the system embodying the invention may be summarized by reference back to FIG. 1. It will be assumed that, initially, the system is at rest and the detent winding 56 energized to hold the type font drum 13 in position and that it is then desired to move the drum 13 to a new position, represented by new coded input or control signals 14. The signals 14 and the shaft position signals 19 are then no longer in correspondence and, as described above, the comparator unit 23 produces a series of output pulses at its terminal 24 which enables a gate 25. Gate 25, triggered by the clock pulses Cc, times the pulses from terminal 24 and applies these timed pulses to trigger or time the sprocket pulses S (FIG. 11, Curve G) in the JK flip-flop 26, the output of which is the pulse SCc (FIG. 11, Curve H). Gate 29, also enabled by pulses from terminal 24, passes the timed sprocket pulses SCc to the JK unit 30, which is triggered by the delayed clock pulse C1 from terminal 22a to develop the pulse SC2 (FIG. 11, Curve M) which are then passed through the OR gate 33. These pulses SC2 are anded with the CW pulses or the CCW pulses in one of the AND gates 35,36, the outputs of which, in turn, are applied to one of the NOR gates 49,52 and inverters 50,53, respectively, to supply CW or CCW pulses to the stepper motor unit 51.

The motor 10 then executes a step-by-step rotation, either CW or CCW, as explained hereinafter. In the absence of the +1/−a1 comparator 43 and the developing of plugging pulses, to be described, the motor 10 continues to step unit 1 the comparator 23 indicates a correspondence between the input signals 14 and the shaft position signals 19, whereupon there are no further enabling pulses from the terminal 24 applied to the gates 25 and 29 and no further motor stepping pulses are developed.

At the same time, a coincidence signal at the terminal 24 of comparator 23 (an absence of pulses) is effective to cause the pulse width generator 58 (FIG. 1) to develop pulses of positive polarity, which are applied to the input terminal 60 of unit 51 (FIG. 4) and thence via the SCR gate 71 to terminal 73 of brake winding 56 to lock the type font drum 13 in the desired position. When the input control signals 14 and the shaft position signals 19 are not in correspondence, output pulses from the terminal 24 disable the generator 58 so that the detent winding 56 is deenergized, permitting stepping of the motor. The delay of pulses SC1 under control of the timing pulses C1 is sufficient to permit the brake winding 56 to become deenergized before a driving pulse is applied to the stepping motor, as described hereinafter.

If, as assumed, the system is initially at rest and a new motor position is called for by input signals 14, the control system, being a closed loop, may tend to lock out. To avoid this, the enabling pulses from the terminal 24 are also applied to a delay unit 34 which is coupled to the OR gate 33 to pass the timed sprocket pulse SC1 (FIG. 11, Curve K). After completion of one cycle of sprocket pulses, the operation previously described takes over and the delayed enabling pulses supplied by delay unit 34 are too late to have any effect on the operation of the OR gate 33.

Consider now the operation of the +1/−1 comparator 43. Referring again to FIG. 1, there follows a summary of the relationships of the several gate to aid the explanation of the operation, initially assuming that CCW rotation of the motor 10 is called for by the comparator unit 23;

a. Gates 35, 41, and 39, through the OR gate 49 and inverter 50 produce motor pulses in the CCW direction and apply then to the terminal 63 of the stepper motor unit 51.

b. Gate 35, responsive to the timed sprocket pulses from OR gate 33 and to CCW pulses from terminal 38 of comparator 23, develops the principal pulses to step the motor 10.

c. Gate 41, responsive to the delayed +1/−1 pulses from terminal 44 of comparator 43 via delay units 47 and 48 and to CCW pulses from the terminal 38, develops the final positioning pulse after the ($n-1$) pulse is generated.

d. Gate 42, responsive to the CCW pulses from terminal 38 and an ($n-1$) pulse from terminal 44 of comparator 43 delayed in unit 47, produces a delayed CW pulse to check the CCW rotation of the motor.

If it is assumed that the comparator unit 23 calls for CW rotation, gates 36, 40, and 42 perform the functions corresponding to the above-described operation of the gates 35, 41, and 39, respectively.

Thus, if it is assumed that the motor is stepping CW, when it reaches the ($n-1$) position, a forward pulse from gate 36 under the control of pulses from the terminal 24 advances the motor toward the final desired position $n$. Shortly thereafter, the output from the terminal 44 of the comparator 43 is applied via a delay unit 47, which has a time delay corresponding to about one-half of the distance between the motor positions ($n-1$) and $n$, and this signal is selected by gate 39 to send pulses to excite the motor for CCW movement, that is, to tend to drive it in a reverse direction to check its momentum and to prevent overshooting. When the motor reaches nearly its final desired position $n$, that is, is a few percent of the distance between its preceding position and its final desired position, a forward pulse from delay unit 48 is anded in gate 40 to supply a forward pulse to the motor and complete its motion to its final position. This last forward pulse, being applied for a very short time period, will minimize any possible overshooting of the type font drum 13 from its final position.

Figure 13:
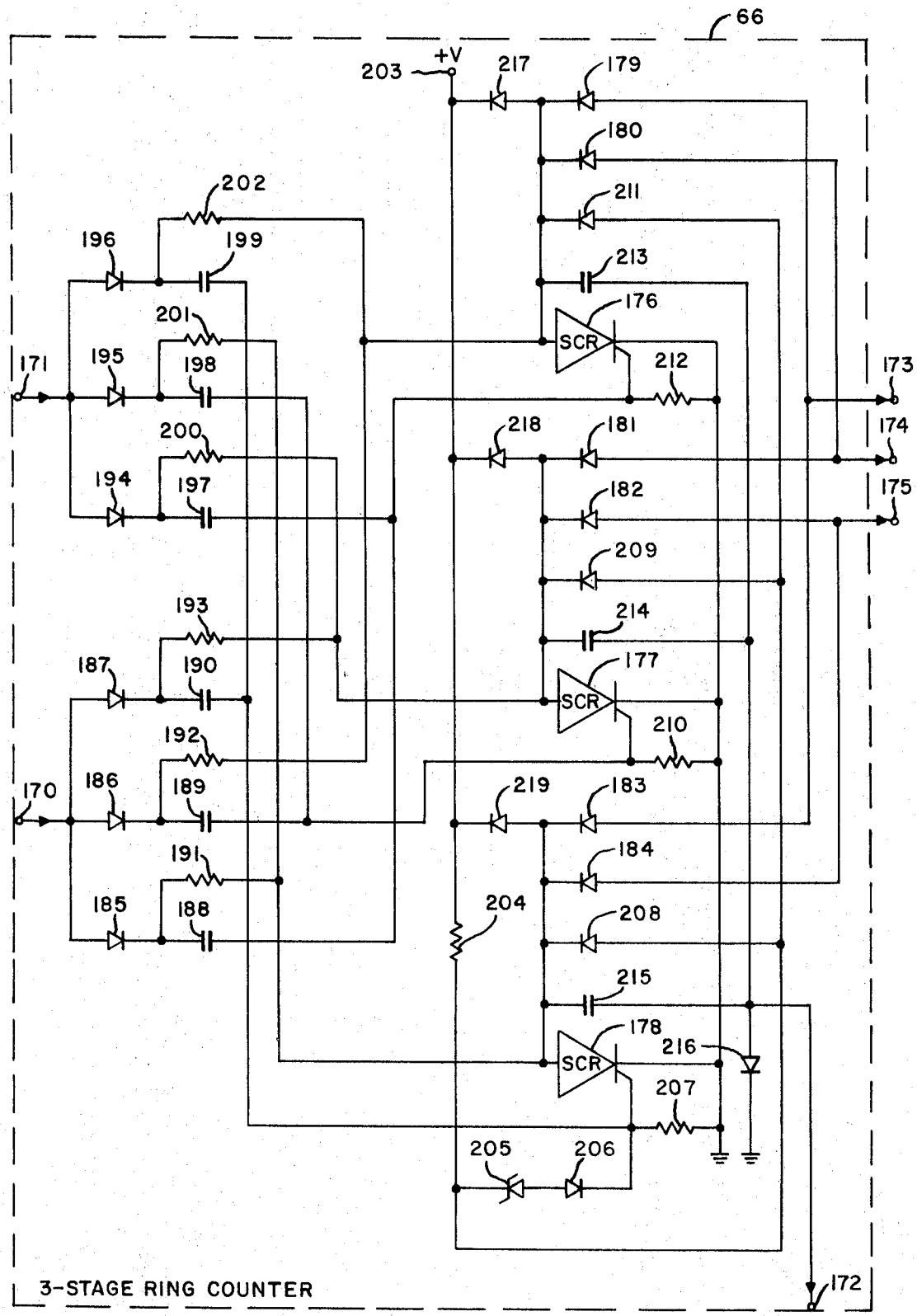
FIG. 13 is a schematic circuit diagram of a ring counter circuit embodied in the electrical control circuit of FIG. 4.

Coming now to the operation of the stepper motor and detent control unit 51 (FIGS. 1 and 4), the CW and CCW signals from input terminals 62,63, respectively, are applied via amplifiers 64,65 respectively, to input terminals 170 and 171 to a three-stage ring counter 66, shown schematically in FIG. 13. Referring to that figure, the unit 66 comprises three SCR devices 176, 177, 178 each in series between two of the motor terminals 173, 174, 175 on the one hand and the common ground connection. The device 176 is connected to the terminal 173 via diode 179 and to terminal 174 via diode 180; the device 177 is connected to the terminal 174 via diode 181 and to terminal 175 via diode 182; while the device 178 is connected to terminal 173 via diode 183 and the terminal 175 via diode 184. It is to be understood that the devices 179—184, inclusive, may be any type of unilaterally conductive devices such as vacuum tube or semiconductor diodes but, for brevity, they have been referred to as diodes and the same is true of other unilaterally conductive devices of FIG. 13 unless otherwise indicated. As explained hereinafter, the SCR's 176, 177, 178 are individually made conductive in sequence, each deice serving to energize two of the phase windings of the motor simultaneously.

In order to control the conductivity of the SCR's 176, 177, 178 in sequence for CW rotation of the motor, the CW input terminal 170 is individually coupled to the control electrodes or gates of these devices through diodes 185, 186, 187, respectively, in series with capacitors 188, 189, 190, respectively. The junctions of these three series circuits are connected to ground through series resistors 191, 192, 193 and the SCR's 178, 176, 177, respectively.

In order to control the conductivities of the SCR's 176, 177, 178, in sequence for CCW rotation of the motor, the CCW input terminal 171 is similarly coupled to the control electrodes or gates of these devices via diodes 194, 195, 196 in series with capacitors 197, 198, 199, respectively, while the junctions of these three series circuits are connected to ground through series resistors 200, 201, 202 and SCR's 177, 178, 176, respectively.

The ring counter of FIG. 13 further includes a starting circuit comprising a voltage-divider connected between a positive source +V at terminal 203 and ground and including a resistor 204, a constant-volatge Zener diode 205, a diode 206, and a resistor 207, the junction between the diode 206 and resistor 207 being connected to the control electrode or gate SCR 178. In order to disable this starting circuit after SCR 178 has become conductive, the junction between resistor 204 and diode 205 is connected to ground via diode 208 and SCR 178 when conductive, thereby lowering the potential of the gate of SCR 178 below the triggering level. Similarly, when SCR 177 is made conductive, as described hereinafter, its starting circuit is disabled via a similar connection through diode 209 and resistor 210 and the starting circuit of SCR 176 is disabled by a similar connection through diode 211 and resistor 212.

Effectively, in parallel with the SCR's 176, 177, 178 are capacitors 213, 214, 215, respectively, having a common connection to terminal 172 which (FIG. 4) is connected to differentiating circuit 67. This connection is also clamped to ground through a diode 216.

In order to suppress, from the SCR's 176, 177, 178, positive-voltage spikes produced when a motor winding is deenergized, diodes 217, 218, 219 are interposed in the connections from the motor windings at terminals 173, 174, 175 and the supply terminal 203 to permit bypassing of voltage surges of a value sufficient to damage or break down the SCR's when nonconductive.

It is believed that the operation of the ring counter of FIG. 13 will be clear from the foregoing description. In brief, when power is first applied to the circuit of FIG. 13, the voltage-divider 204, 205, 206, 207 applies a positive voltage to the gate of SCR 178, turning it on. This device is in the return of motor windings ø1 and ø3. Diode 208 then conducts through SCR 178, effectively short-circuiting the portion of the voltage-divider circuit 205, 206, 207 which supplies a positive bias to the SCR 178, and, thus, disabling the starting circuit of 178.

Under these conditions, resistor 191 is now returned to ground through SCR 178 and allows diode 185 to become conductive when the first positive CW pulse is applied to the input terminal 170. This pulse will be applied through capacitor 188 to the gate of SCR 176, turning it on. When 176 becomes conductive, it discharges capacitor 213 which develops a negative-going pulse which is clamped to ground by diode 216 and appears at the terminal 172. This negative pulse developed across diode 216 is coupled through capacitor 215 to the anode of the SCR 178, turning it off. When SCR 178 is turned off, motor winding ø3 is deenergized but motor windings ø1 and ø2 now become energized through SCR 176, causing the stepper motor to step CW by 15°.

When SCR 176 becomes conductive, resistor 192 is now returned to ground therethrough, allowing diode 186 to conduct when the next positive CW pulse is applied to terminal 170. This pulse is applied through diode 186 and capacitor 189 to the gate of SCR 177, turning it on. When SCR 177 becomes conductive, it discharges capacitor 214, again developing a negative pulse across diode 216 which is coupled through capacitor 213 to the anode of SCR 176, turning it off. When SCR 176 is turned off, motor winding ø1 is deenergized while windings ø2 and ø3 now become energized through SCR 177, causing the motor to step another 15° CW.

With SCR 177 conducting, resistors 193 is now returned to ground therethrough, allowing diode 187 to conduct on the next CW pulse from terminal 170. This pulse is coupled through capacitor 190 to the gate of SCR 178, turning it on. This discharges capacitor 215, which was charged to +V when SCR 178 was turned off. The negative pulse thereby developed across diode 216 is coupled through capacitor 214 to the anode of SCR 177, turning it off. Motor winding ø2 is now deenergized while windings ø1 and ø3 become energized through SCR 178, causing the motor to step CW 15° and completing one cycle of operation of the ring counter. Thus, successive CW pulses applied to input terminal 170 cause the SCR's to become conductive in the order 178, 176, 177, 178, etc., energizing the motor windings in pairs in the sequence ø1 and ø3, ø1 and ø2, and ø2 and ø3. Since there are only three strator windings on the stepper motor, a three-stage ring counter is all that is required to step the motor continuously in a CW direction as long as CW pulses are applied to the input terminal 170.

In order to step the motor in the CCW direction, positive-going pulses from terminal 171 are applied to the similar diode logic circuit comprising diodes 194, 195, 196. As before, when power is first applied to the circuit of FIG. 13, SCR 178 becomes conductive, energizing motor windings ø1 and ø3. Resistor 201 is then returned to ground and, upon the occurrence of the first CCW pulses at terminal 171, diode 195 becomes conductive and applies such pulses via capacitor 198 to the gate of SCR 177, turning it on and discharging capacitor 214 which develops a negative pulse across diode 216 which is applied to the anode of SCR 178, turning it off. The next CCW pulse from terminal 171 via diode 194 and capacitor 197 turns on SCR 178 and turns off SCR 176. This cycle is repeated for successive CCW pulses, causing the SCR's to become conductive in the order 178, 177, 176, 178, which is the reverse of the order in which they are rendered conductive by the CW pulses as described above. This causes the motor to rotate CCW in increments of 15° for each CCW pulse.

Referring now to FIG. 4, a Detent ON signal energizes the detent winding 56 via SCR unit 71 when the stepper motor reaches its desired position to lock the type font drum, as described above, such operation being initiated by introducing a new set of position-representative signals via the terminals 14. Substantially simultaneously, noncoincidence pulses from the terminal 24 of comparator 23 cause the generator 59 to develop a positive-going Detent OFF pulse which is applied to terminal 61 of unit 51 to turn on SCR unit 72 which, via coupling capacitor 74, turns off SCR unit 71, deenergizing detent windings 56 to permit the motor 10 to step to a new position.

Also as described above, a Reduced Power pulse derived from the Detent ON pulse, but delayed with respect thereto about 10 ms. in unit 45, is applied to terminal 46 of unit 51 and, via SCR 76, applies a negative pulse to the control electrode of power transistor 68, cutting it off and inserting resistor 69 in the common return line of the windings ø1, ø2, ø3 of the stepper motor, thus reducing the power to the motor during the final portion of its movement in response to the final positioning pulse, as described above. Thus, the stepper motor moves into its final position at reduced speed, minimizing overshooting and hunting. This reduced power also minimizes heating of the motor windings should the motor remain at rest for a considerable period, it being remembered that two windings of the motor are always energized.

The first CW or CCW pulse to the ring counter 66 is differentiated in unit 67 to develop a negative-going pulse on the trailing edge thereof. This negative pulse is applied to the anode of SCR unit 72 to turn it off and, thus, condition it to receive the next Detent OFF signal. This differentiated negative pulse is also applied to the SCR unit 76 to cut it off and thus turn on the power transistor 68 to restore full power to the motor for a normal stepping operation. It is further applied to the anode of SCR 71, but, since this device is already nonconductive, such negative pulse has no effect on the SCR 71.

While there has been described what is, at present, considered to be the preferred embodiment of the invention it will be obvious to those skilled in the art that various changes and modifications may be made therein, without departing from the invention, and it is, therefore, aimed in the appended claims to cover all such changes and modifications as fall within the true spirit and scope of the invention.

What we claim is:

1. A system for operating a stepper motor to a preselected position in response to an encoded digital signal comprising:
   a multichannel input circuit for supplying encoded groups of parallel digital control pulses for a motor to be controlled;
   means adapted to be driven by a motor to be controlled for generating after each step an encoded group of parallel digital position-representative pulses;
   a coincidence comparator coupled to said input circuit and to said generating means and effective to develop an output pulse upon each successive comparison of said pulse groups when said two pulse groups do not correspond;
   circuit means responsive to said output pulse for developing and applying a corresponding pulse to a stepper motor to be controlled;
   and means responsive to correspondence between said two pulse groups for disabling said circuit means to stop the motor.

2. A system for operating a stepper motor to a preselected position in accordance with claim 1 in which said generating means includes a drum having a plurality of encoded position-representative holes and a photoelectric hole-sensing apparatus.

3. A system for operating a stepper motor to a preselected position in accordance with claim 2 in which said holes are arranged in angularly spaced axial rows of code groups.

4. A system for operating a stepper motor to a preselected position in accordance with claim 2 in which said drum also includes a peripheral ring of equally spaced timing holes and photoelectric sensing means therefor and in which said pulse-developing circuit means is controlled by said sensing means.

5. A system for operating a stepper motor to a preselected position in accordance with claim 1 which includes a source of timing signals and in which said pulse-developing circuit means is jointly responsive to said timing signals and to said comparator output signal.

6. A system for operating a stepper motor to a preselected position in accordance with claim 1 which includes a source of timing signals and a circuit jointly responsive to said timing signals and to said comparator output signal for controlling the application of said position-representative signal to said comparator.

7. A system for operating a stepper motor to a preselected position in accordance with claim 1 in which the motor is provided with a drive shaft and including an electromagnetic detent rigidly coupled to the motor shaft and having an angular positioning accuracy substantially greater than that of the stepper motor and means for energizing said detent only when the stepper motor has arrived at its preselected position, accurately to hold the motor in such position.

8. A system for operating a stepper motor to a preselected position in accordance with claim 1 in which the motor is provided with a drive shaft and including an electromagnetic detent rigidly coupled to the motor shaft and having an angular positioning accuracy substantially greater than that of the stepper motor and means responsive to said output signal to energize said detent and for energizing selected windings of the motor with direct current of a magnitude less than that of said pulses to lock the motor in the selected position.

9. A system for accurately positioning a stepper motor in a preselected position in response to a series of electrical pulses comprising:
   an input circuit for supplying a series of electrical pulses to a stepper motor to be controlled;
   a normally deenergized electromagnetic detent including a stator and a rotor rigidly connected to be driven by said controlled stepper motor and having an angular positioning accuracy substantially greater than that of the stepper motor;
   and control means for energizing said detent substantially at the conclusion of said series of pulses to lock the motor in the selected position.

10. A system for accurately positioning a stepper motor in a preselected position in accordance with claim 9 in which said stator and said rotor have a plurality of complementary precision teeth which upon energization of the detent are locked in registering positions.